B. CARL.
AUTOMATIC GEAR SHIFT FOR MOTOR VEHICLES.
APPLICATION FILED JUNE 3, 1918.

1,354,724.

Patented Oct. 5, 1920.

Inventor
Benjamin Carl
by Edward E. Longan
Atty

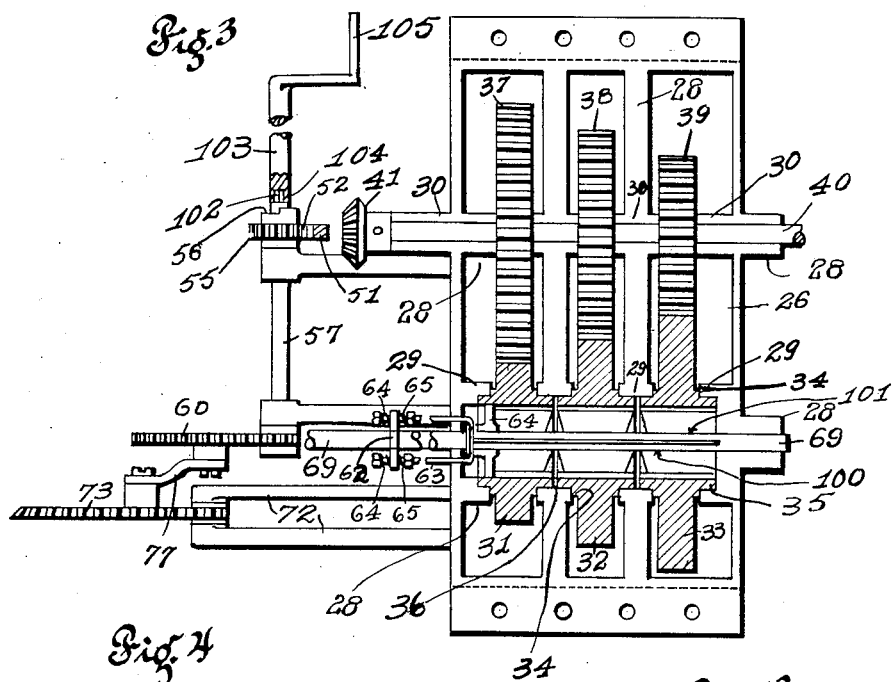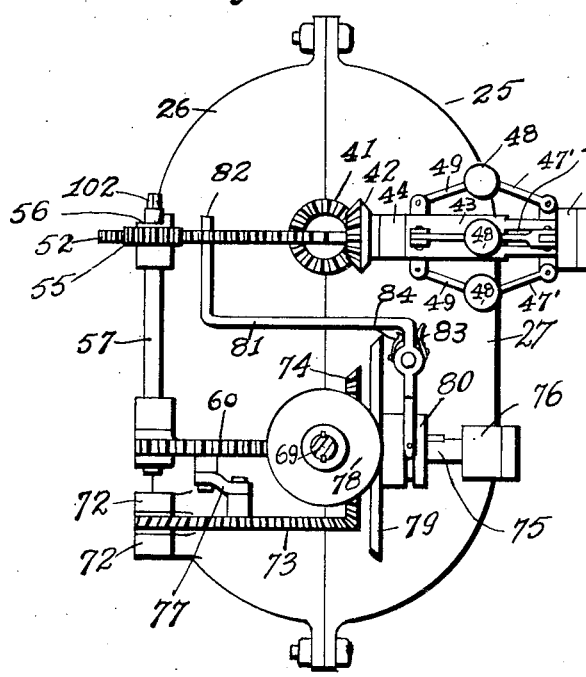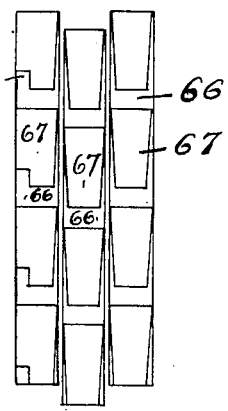

B. CARL.
AUTOMATIC GEAR SHIFT FOR MOTOR VEHICLES.
APPLICATION FILED JUNE 3, 1918.
1,354,724.
Patented Oct. 5, 1920.
4 SHEETS—SHEET 3.
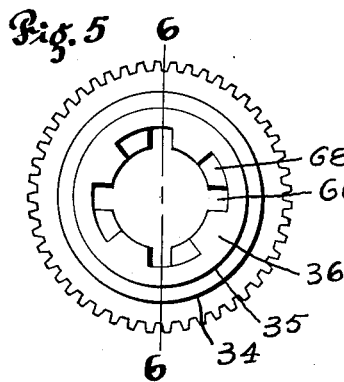
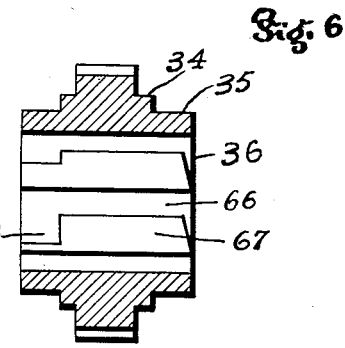
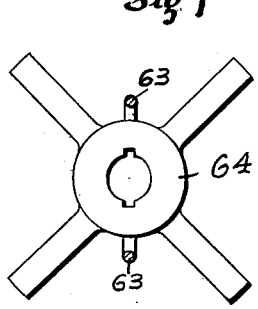
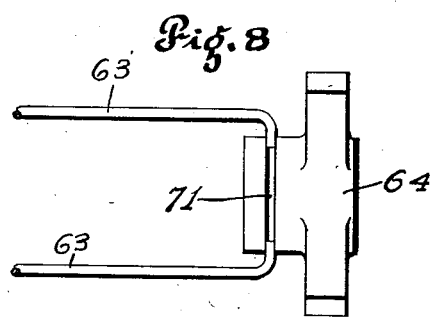
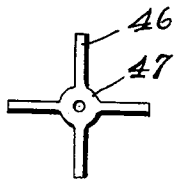
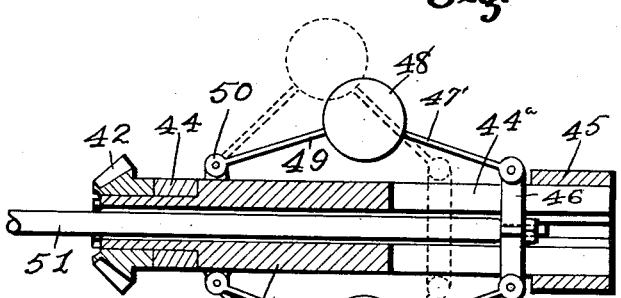
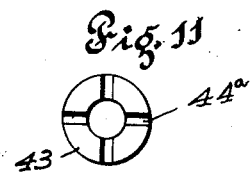
Inventor
Benjamin Carl
by Edward E Longan
Atty

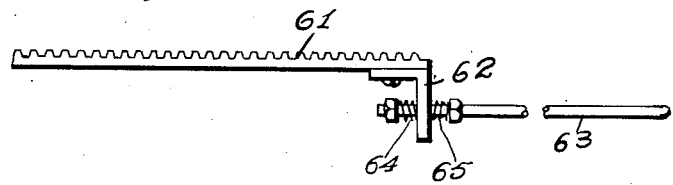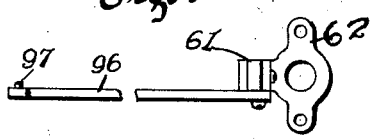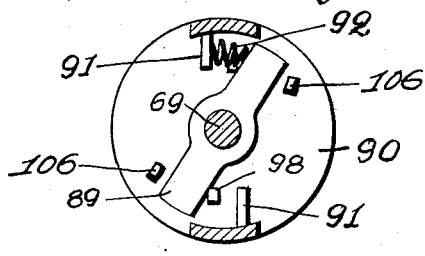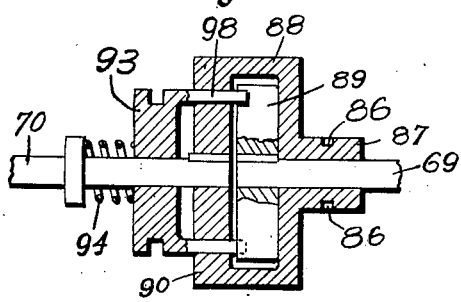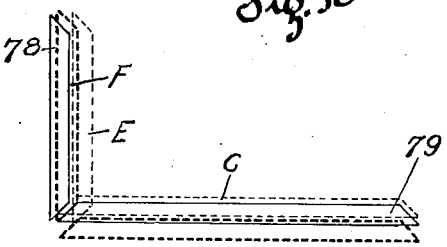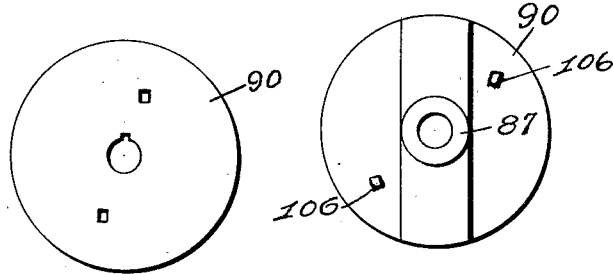

UNITED STATES PATENT OFFICE.

BENJAMIN CARL, OF SPRINGFIELD, MISSOURI.

AUTOMATIC GEAR-SHIFT FOR MOTOR-VEHICLES.

1,354,724.  Specification of Letters Patent.  Patented Oct. 5, 1920.

Application filed June 3, 1918. Serial No. 237,911.

*To all whom it may concern:*

Be it known that I, BENJAMIN CARL, a citizen of the United States, and resident of Springfield, county of Greene, and State of Missouri, have invented certain new and useful Improvements in Automatic Gear-Shifts for Motor-Vehicles, of which the following is a specification, containing a full, clear, and exact description, reference being had to accompanying drawings, forming a part thereof.

My invention relates to automatic gear shifts for motor vehicles, and has for its object, a device which will shift a motor vehicle from low to intermediate and high speeds, without any effort on the part of the operator. A further object of my device is to provide a means whereby the several steps or speeds of transmission are automatically thrown into engagement by the speed of the vehicle, and automatically returned to a lower speed when the speed of the machine drops below a predetermined rate.

In the drawings,

Fig. 3 is a side view with a portion of the transmission housing removed.

Fig. 4 is an end view of my device.

Fig. 5 is an end view of one of the gears made use of.

Fig. 6 is a cross sectional view taken on the line 6—6 of Fig. 5.

Fig. 7 is an end view of the spider, which travels through the several gears in the transmission device.

Fig. 8 is a side view of the same.

Fig. 9 is a view of the governor controlling the gear shift, with parts in section, and showing the manner in which the spider is advanced.

Fig. 10 is a view of the spider, which is actuated by the governor.

Fig. 11 is an end view of the hollow governor shaft, showing the slots through which the spider shown in Fig. 10 passes.

Fig. 12 is a top view of the gear spider shifting mechanism, showing the shock absorbing springs.

Fig. 13 is an end view of the same, showing the bent lever which controls the flexible coupling.

Fig. 14 is a view of the flexible coupling with parts in section, and also the locking lugs in place.

Fig. 15 is a cross section of the flexible coupling, showing the locking lugs in position.

Figs. 16 and 17 are views of that part of the flexible coupling which is attached directly to the engine shaft.

Fig. 18 is a diagrammatical view of the friction wheels, showing their several positions by dotted lines.

Fig. 19 is a diagrammatical view of the interior of the gears, in which the spider operates.

Figure 1:
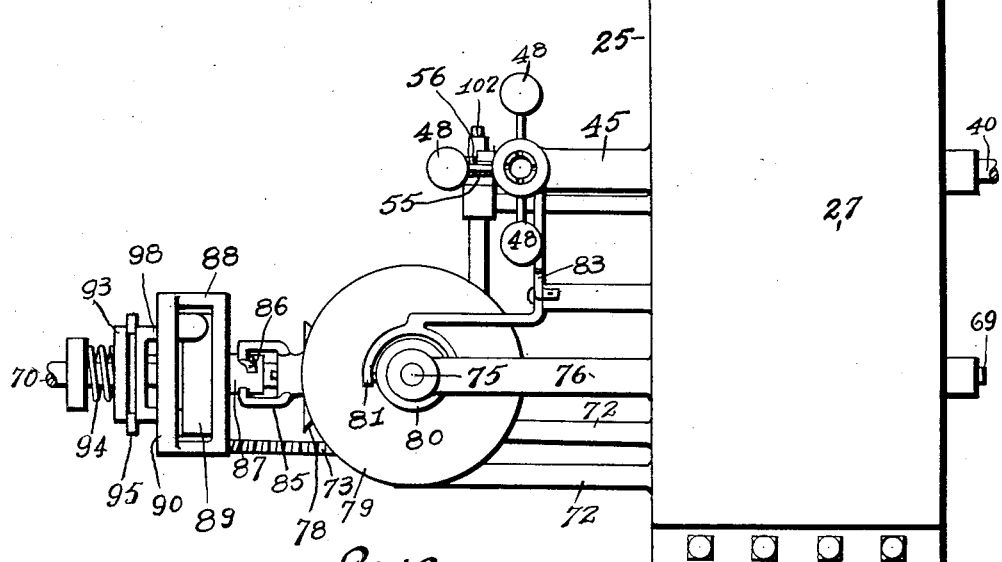
Figure 1 is a side view of my device.
Figure 2:
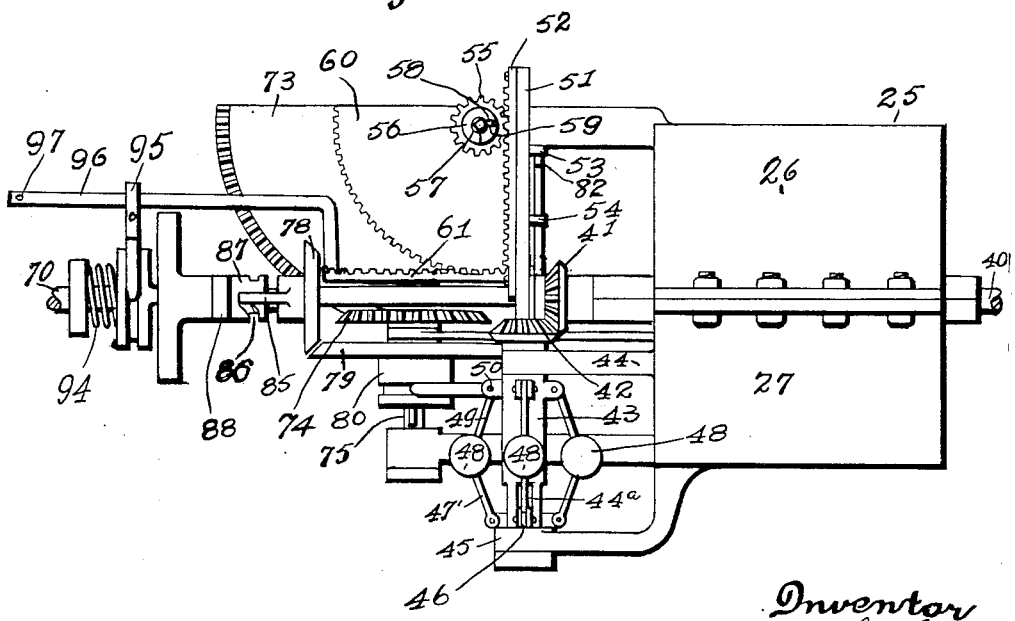
Fig. 2 is a top plan view of the same.

In carrying out my invention, I provide a gear casing 25, which is composed of two sections 26 and 27. Formed integrally with these sections are the bearings 28. These bearing sections are provided with half boxes 29 and 30. In the boxes 29, the gears 31, 32 and 33 are located, being low, intermediate and high speed respectively. These gears, as will be seen from Figs. 5 and 6, are provided with hubs 34, which work or bear against the sides of the boxes, and the projecting ends 35, which are located in the boxes, form a bearing point for the gears. The object of the hubs 34 is to prevent the ends 36 of the several gears from contacting and causing excess friction.

These gears 31, 32 and 33 mesh in turn with the gears 37, 38 and 39 respectively, which are mounted on what is commercially called the propeller shaft 40. This propeller shaft is mounted in the boxes 30. On the end of the propeller shaft is mounted bevel gear 41, which in turn meshes with the bevel gear 42, which is mounted on the hollow governor shaft 43. This governor shaft is supported in the bearings 44 and 45, which are attached to the casing 25.

A portion of the shaft 43 is provided with slots 44ª, so that the arms 46 of the spider 47 may freely operate therein. Arms 46 are attached to resilient bars 47' of the governor balls 48. Another resilient arm 49 is attached to each ball and pivotally at points indicated by the numeral 50, to the hollow shaft 43. Traveling through the hollow shaft 43 is a bar 51, which is swivelly connected to the spider 47, and to this bar is attached a rack 52. On the rear end of this bar I attach pins 53 and 54, the use of which will be explained later.

The rack 52 meshes with the gear 55. This gear has a portion of its hub cut away, as indicated by the numeral 56, and is mounted on a shaft 57. The shaft 57 is provided with a projecting pin 58 so that the shoulder 59, formed by the cutaway portion 56, will bear against this pin when the rack is driven forward by the action of the governor.

On the lower end of the shaft 57 I mount a segment gear 60, which meshes with a rack 61. This rack 61 is attached to the yoke 62, and to this yoke are attached rods 63, which are connected to the spider 64, which spider drives the gears 31, 32 and 33. The rods 63 are provided with springs 64 and 65 mounted on either side of the yoke 62, and serve the purpose of absorbing the shock, as well as preventing the jamming of the spider against the shift gears.

The gears are provided on their interior surface with grooves 66 and tapered projections 67. The object of these tapered projections is to allow the spider 64 to enter the grooves of the different gears more readily. The low speed wheel or gear is also provided with an additional recess 68, which is made use of when the machine is reversed. The object of this undercut portion is to lock the spider temporarily, so that as the speed of the machine increases, the spider cannot be fed forward into the intermediate gear, but must remain in the low speed during the reverse drive.

The spider 64 is mounted on a shaft 69, which is flexibly connected to the shaft 70, which runs direct from the friction clutch. This friction clutch is not shown, as it is in common use on all motor vehicles. The yoke 62 is mounted over this shaft, and the ends of the rod 63 entering the groove 71 formed in the hub of the spider 64.

Attached to the housing 26, I provide bearings 72, which support a bevel segment 73, which meshes with the bevel gear 74 mounted on the shaft 75. This shaft is supported in bearing 76 formed on the portion 27 of the housing. Segment 73 is connected to the segment 60 by means of a lever 77, the use of which will be explained later.

On the shaft 69, I key a conical friction wheel 78, which may mesh with the wheel 79 of similar character. This wheel 79 is provided with a grooved hub 80, and is keyed on the shaft 75. The wheel 79 is operated by a bell crank forked lever 81, the upper end 82 extending behind the bar 51, so that it can contact with the pins 53 and 54. When the machine arrives at a predetermined high speed, the pin 54 contacts with the end 82 of the lever 81, forcing the wheel 79 into position, as shown by D, and indicated by the heavy dotted lines in Fig. 18.

When the machine travels at a predetermined slow speed, the pin 53 will contact with the end 82 of the lever, forcing the wheel 79 into position C, as indicated in Fig. 18. The wheel is normally held in neutral position, as shown by the solid lines in Fig. 18, by means of the springs 83 and 84.

The wheel 78 is provided with projecting lugs 85, which fit into spiral grooves 86 formed in the hub 87 of the portion 88 of the flexible coupling, which connects the shafts 69 and 70. This hub 87 is loosely mounted on the shaft 69 so as to allow free rotation thereon. Keyed to the end of the shaft 69 I provide a pair of arms 89, which form the other portion of the coupling. The portion 90 of the coupling is provided with a pair of lugs 91, and between these lugs and the arms 89, I interpose springs 92, which make up, collectively, a flexible coupling. The coupling is normally held rigid by means of a yoke 93 mounted on the shaft 70. This yoke is actuated by the spring 94 and the forked lever 95, which is attached to any suitable portion of the body of the machine.

On the under side of the rack 61, I provide an L shaped bar 96, provided at its outermost end with a pin 97. This pin is adapted to contact with the end of the forked lever 95 when the rack has almost traveled to its innermost position, or point 100, withdrawing the prongs 98 formed on the yoke 93, and allowing the springs 92 to have full action, and making the coupling flexible. The object of this flexible coupling is that when any sudden straining comes on the engine, the portion 88 of the flexible coupling will compress the spring, and travel faster than the portion 89, forcing the wheel 78 forward, as indicated by light and heavy dotted lines E and F respectively, so that this wheel can make connections with the wheel 79, thereby actuating the beveled gear 74, which in turn will operate the wheels or segments 73 and 60 through the connection 77, withdrawing the spider to a lower speed.

As soon as this speed has been attained, the spring will cause the several parts of flexible coupling to assume their normal positions, and the machine will run in that speed until an additional strain has been put on the machine, or until the machine has again dropped below its normal speed for that ratio of gear. At this time, the pin 53 will contact with the end 82 of the lever 81, forcing the wheel 79 forward into contact with the wheel 78, and through the movements aforesaid, the spider 64 will be withdrawn further into the low speed gear, in which it will remain until the speed of the vehicle will again be picked up sufficiently to pass into the intermediate and high speed gears.

It is, of course, my intention that I may employ any number of gears between the low and high speed, so that the rate of travel can be regulated accordingly.

The operation of my device is as follows: The engine being started, and the clutch thrown in, the power is transmitted from the shaft 70 to the shaft 69 through the flexible coupling 88, this coupling being locked in rigid position until the high gear is reached. At this time it is released, and the spring 92 carries the load.

When the device starts, the governor 48 is set in action by means of the gears 41 and 42, and when it attains a certain amount of centrifugal force, the balls of the governor expand, forcing the rod 51, carrying the rack 52, outward. This in turn acts on the gear 55, and through the shaft 57, motion is also imparted to the segment 60, which shifts the rack 61 and its accompanying shafts or rods 63 and the spider 64 into the several gears.

After the spider has arrived in the highest speed or gear 33, and has traveled to a predetermined point as No. 100, the pin 97 on the L shaped lever 96 contacts with forked lever 95, withdrawing the ends, or prongs, 98, from contact with the part 89 of the flexible coupling. When the spider has traveled to another predetermined point in gear 33, as 101, the pin 54 mounted on the shaft or rod 51, contacts with the end 82 of the lever 81, thus forcing the wheel 79 into position D, as shown in Fig. 18.

When a sudden strain is placed on the engine, the part 88 of the coupling will gain upon the part 89, causing a partial turning. Lugs 85 are fed forward by means of the spiral slots 86, causing the wheel 78 to contact with wheel 79, thus withdrawing the spider into the gear of next lowest ratio, after which the flexible coupling will resume its original position.

When this operation has taken place, the forked lever 95 is released, allowing the tongues 98 to securely lock the flexible coupling, and when the device has dropped below a predetermined speed, the pin 53 will engage the end 82 of the lever, and force the wheel 79 into position C, as indicated by light dotted lines in Fig. 18, thereby further withdrawing the spider 64, and putting the same in low gear. The pockets 68 in the low gear are intended for reversing the vehicle, which may be accomplished by either having a reversible gas engine, or interposing auxiliary gears between the clutch and transmission.

What I desire to achieve by my device is the shifting of gears from low to high speed without any manual effort on the part of the operator driving the same, and vice versa, so as to prevent the stalling of the engine when traveling up grade.

By the use of my device, it is possible for the operator at all times to keep both hands on the steering wheel, except when making an emergency stop, as well as doing away with the gear shift lever, which is at the present time mounted in the center of the body, and hinders the egress or entrance into the machine when stopped at the curb.

The upper end of the shaft 57 is provided with a squared end 102, over which is fitted a crank 103. This crank 103 is provided at its lower end with a socket 104, which fits over the squared end 102, and its upper end being provided with handle 105. The object of this crank is so that it can be inserted through the flooring of the machine in case the governor or retracting mechanism may become disabled; that the operator of the machine can shift gears from low to high, or from high to low respectively.

The portion 90 of the flexible coupling is provided with projections 106, the object of which is to prevent the arms 89 from revolving too far backward when the machine is reversed, thus unseating the springs, which form the flexible connection when the machine is driven forward.

My object in providing a manually operated mechanism for shifting the gears is that in the event the governor or the springs on the flexible connection become broken, or are otherwise interrupted, the same can be operated by hand, as it is common in all self-starting means on automobiles to provide a manual operative means by which the machine can be started.

It is, of course, understood that I may provide a lever, instead of the crank 103, to operate the shifting of the gears backward and forward; the only reason for showing the crank being that my device may be so arranged as to utilize the removable starting crank, which is furnished with every self-starting machine.

Having fully described my invention, what I claim is:—

1. A device of the class described, comprising a housing, gears contained within the housing, means for automatically shifting the gears from low to high speed, and means for automatically shifting the gears from high to low speed substantially as specified.

2. A device of the class described comprising a housing, gears located within the housing, a governor, flexibly controlled means for automatically shifting the gears from high to low and from low to high in combination with a manually operated shifting means, said manually operated shifting means adapted to be operated independently of the governor means.

3. A device of the class described, comprising a transmission, a positively driven shaft, divided into two portions, a flexible connection connecting the portions, means for locking the flexible connection, a spider located on the driving shaft for imparting motion to the transmission, means for advancing and retracting the spider, a housing containing gears, whereby the transmission is actuated from the engine to the rear axle of a vehicle, and means controlled by the flexible connection for retracting the spider from high to low speeds.

4. A device of the class described, comprising an engine shaft, a driving shaft, a flexible connection between said shafts, a propeller shaft, a housing mounted around the propeller shaft and the driving shaft, a plurality of meshing gears connecting the propeller shaft and the driving shaft, a spider located on the driving shaft for placing the gears located thereon in operation, a governor mounted on said housing and actuated by the propeller shaft for operating the spider forwardly and rearwardly, and means controlled by the flexible connection for retracting the spider independently of the governor control.

5. A device of the class described, comprising a housing, gears contained within the housing, means for automatically shifting the gears from low to high speed, and means for automatically shifting the gears from high to low speed, and a manually operated mechanism for shifting the gears from high to low, and from low to high speed, substantially as specified.

6. A device of the class described, comprising a housing, gears contained within the housing, means for automatically shifting the gears from low to high speed, and means for automatically shifting the gears from high to low speed, and a crank mechanism for shifting gears from low to high and from high to low speeds.

7. A device of the class described comprising a housing, gears contained within the housing, a governor controlled means mounted without the housing for automatically shifting the gears from high to low and from low to high speed, a handle detachably secured to the shifting means for manually operating the same, and a means for automatically shifting the gears from high to low speed independently of the governor controlled or manually operated mechanism.

In testimony whereof, I have signed my name to this specification, in the presence of two subscribing witnesses.

BENJAMIN CARL.

Witnesses:
  Rose C. Lupman,
  E. C. King.